United States Patent
Kaluzhny et al.

(10) Patent No.: US 10,037,441 B2
(45) Date of Patent: Jul. 31, 2018

(54) BUS PROTECTION WITH IMPROVED KEY ENTROPY

(71) Applicant: Winbond Electronics Corporation, Zhubei (TW)

(72) Inventors: Uri Kaluzhny, Beit Shemesh (IL); Nir Tasher, Tel Mond (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 0 days.

(21) Appl. No.: 14/702,791

(22) Filed: May 4, 2015

(65) Prior Publication Data

US 2016/0098580 A1    Apr. 7, 2016

(30) Foreign Application Priority Data

Oct. 2, 2014 (IL) .......................................... 234956

(51) Int. Cl.
| | |
|---|---|
| *G06F 12/14* | (2006.01) |
| *G06F 11/30* | (2006.01) |
| *G06F 21/85* | (2013.01) |
| *H04L 9/08* | (2006.01) |
| *G09C 1/00* | (2006.01) |

(52) U.S. Cl.
CPC .............. *G06F 21/85* (2013.01); *G09C 1/00* (2013.01); *H04L 9/0861* (2013.01); *H04L 9/0869* (2013.01); *H04L 2209/125* (2013.01)

(58) Field of Classification Search
CPC ...... G06F 21/85; H04L 9/0861; H04L 9/0869
USPC ......................................................... 713/189
See application file for complete search history.

(56) References Cited

U.S. PATENT DOCUMENTS

| | | | |
|---|---|---|---|
| 4,521,853 A | 6/1985 | Guttag | |
| 5,058,164 A * | 10/1991 | Elmer | G06F 12/1408 380/277 |
| 5,081,675 A * | 1/1992 | Kittirutsunetorn | G06F 12/1408 705/51 |
| 5,404,402 A | 4/1995 | Sprunk | |
| 5,671,283 A | 9/1997 | Michener et al. | |
| 6,012,148 A * | 1/2000 | Laberge | G06F 11/0745 714/2 |

(Continued)

FOREIGN PATENT DOCUMENTS

| | | |
|---|---|---|
| AU | 2001027074 B2 | 7/2001 |
| EP | 1615370 A1 | 1/2006 |

(Continued)

OTHER PUBLICATIONS

Xiaotong ZhuangHIDE: An Infrastructure for Efficiently Protecting Information Leakage on the Address Bus,, ACM-2004, p. 72-84.*

(Continued)

*Primary Examiner* — Monjour Rahim
(74) *Attorney, Agent, or Firm* — D. Kligler IP Services Ltd.

(57) ABSTRACT

An apparatus includes a processor and a bus encryption unit. The processor is configured to communicate information over a secured data bus, and to communicate respective addresses over an address bus. The bus encryption unit is configured to generate an encryption key based on multiple addresses that appeared on the address bus, and to encrypt the information communicated between the processor and the secured data bus with the encryption key.

18 Claims, 2 Drawing Sheets

(56) References Cited

U.S. PATENT DOCUMENTS

| | | | |
|---|---|---|---|
| 6,272,637 B1* | 8/2001 | Little | G06F 12/1408 380/52 |
| 6,915,175 B2 | 7/2005 | Ann | |
| 6,976,136 B2 | 12/2005 | Falik et al. | |
| 7,082,539 B1* | 7/2006 | Kitahara | G06F 21/71 713/189 |
| 7,194,626 B2 | 3/2007 | Craft | |
| 7,237,081 B2* | 6/2007 | Dahan | G06F 9/30047 711/163 |
| 7,242,772 B1 | 7/2007 | Tehranchi | |
| 7,248,696 B2* | 7/2007 | Craft | H04L 9/0662 380/263 |
| 7,269,747 B2 | 9/2007 | Catherman et al. | |
| 7,340,577 B1* | 3/2008 | Van Dyke | G06F 13/4243 711/167 |
| 7,739,565 B1 | 6/2010 | Lesea | |
| 7,826,271 B2 | 11/2010 | Cernea | |
| 7,836,269 B2 | 11/2010 | Obereiner et al. | |
| 7,881,094 B2 | 2/2011 | Chen | |
| 7,882,365 B2 | 2/2011 | Natarajan et al. | |
| 7,889,592 B2 | 2/2011 | Kim | |
| 8,041,032 B2 | 10/2011 | Katoozi et al. | |
| 8,108,941 B2 | 1/2012 | Kanai | |
| 8,140,824 B2 | 3/2012 | Craft | |
| 8,225,182 B2 | 7/2012 | Kagan et al. | |
| 8,266,194 B2 | 9/2012 | Kaluzhny | |
| 8,312,294 B2 | 11/2012 | Sato et al. | |
| 8,427,194 B2 | 4/2013 | Deas et al. | |
| 8,429,513 B2 | 4/2013 | Smith et al. | |
| 8,549,246 B2 | 10/2013 | Pekny et al. | |
| 8,576,622 B2 | 11/2013 | Yoon et al. | |
| 8,578,179 B2 | 11/2013 | Accicmez et al. | |
| 8,745,408 B2 | 6/2014 | Mangard | |
| 8,756,439 B1 | 6/2014 | Jannson et al. | |
| 8,781,111 B2 | 7/2014 | Qi et al. | |
| 8,832,455 B1 | 12/2014 | Drewry et al. | |
| 9,430,406 B2* | 8/2016 | Van Der Sluis | H04L 9/0866 |
| 2001/0003540 A1* | 6/2001 | Pomet | H04L 9/00 380/260 |
| 2002/0164022 A1* | 11/2002 | Strasser | H04N 7/1675 380/201 |
| 2003/0005453 A1 | 1/2003 | Rodriguez et al. | |
| 2003/0061454 A1* | 3/2003 | Ruehle | G06F 13/4239 711/154 |
| 2003/0084285 A1 | 5/2003 | Cromer et al. | |
| 2003/0084346 A1 | 5/2003 | Kozuch et al. | |
| 2003/0097579 A1 | 5/2003 | England et al. | |
| 2003/0200026 A1 | 10/2003 | Pearson | |
| 2004/0260932 A1* | 12/2004 | Blangy | G06F 21/75 713/189 |
| 2005/0021986 A1* | 1/2005 | Graunke | G06F 12/1408 713/193 |
| 2005/0024922 A1 | 2/2005 | Li et al. | |
| 2005/0039035 A1 | 2/2005 | Clowes | |
| 2005/0058285 A1 | 3/2005 | Stein et al. | |
| 2005/0114687 A1 | 5/2005 | Zimmer et al. | |
| 2005/0123135 A1 | 6/2005 | Hunt et al. | |
| 2006/0026418 A1 | 2/2006 | Bade et al. | |
| 2006/0026693 A1 | 2/2006 | Bade et al. | |
| 2006/0059553 A1* | 3/2006 | Morais | G06F 12/1408 726/22 |
| 2006/0107054 A1 | 5/2006 | Young | |
| 2006/0161773 A1* | 7/2006 | Okazaki | G06F 21/52 713/168 |
| 2006/0253708 A1 | 11/2006 | Bardouillet et al. | |
| 2007/0101424 A1* | 5/2007 | Ravi | G06F 13/4031 726/22 |
| 2007/0133437 A1 | 6/2007 | Wengrovitz et al. | |
| 2007/0192592 A1* | 8/2007 | Goettfert | G06F 12/1408 713/162 |
| 2008/0005586 A1* | 1/2008 | Munguia | G06F 12/1408 713/189 |
| 2008/0155273 A1* | 6/2008 | Conti | G06F 12/1425 713/190 |
| 2009/0217377 A1 | 8/2009 | Arbaugh et al. | |
| 2009/0327633 A1 | 12/2009 | Fusella et al. | |
| 2010/0005272 A1* | 1/2010 | Vuletic | G06F 12/1081 711/213 |
| 2010/0070779 A1 | 3/2010 | Martinez et al. | |
| 2010/0098247 A1 | 4/2010 | Suumaki | |
| 2010/0106920 A1 | 4/2010 | Anckaert et al. | |
| 2010/0146190 A1 | 6/2010 | Chang | |
| 2010/0158242 A1 | 6/2010 | Asher | |
| 2010/0169654 A1 | 7/2010 | Kiel et al. | |
| 2010/0299537 A1* | 11/2010 | Mackey | G06F 12/1408 713/190 |
| 2011/0185435 A1 | 7/2011 | Chang | |
| 2011/0283115 A1 | 11/2011 | Junod | |
| 2011/0285421 A1 | 11/2011 | Deas et al. | |
| 2011/0286599 A1* | 11/2011 | Tuyls | H04L 9/0866 380/278 |
| 2012/0079221 A1 | 3/2012 | Sivasubramanian et al. | |
| 2012/0102307 A1 | 4/2012 | Wong | |
| 2012/0166715 A1* | 6/2012 | Frost | G06F 11/1068 711/103 |
| 2012/0204056 A1 | 8/2012 | Airaud et al. | |
| 2012/0275595 A1 | 11/2012 | Emelko | |
| 2013/0145177 A1* | 6/2013 | Cordella | G06F 12/1408 713/193 |
| 2013/0205080 A1* | 8/2013 | Felton | G06F 21/79 711/105 |
| 2013/0262880 A1 | 10/2013 | Pong et al. | |
| 2013/0339730 A1 | 12/2013 | Nagai et al. | |
| 2013/0339744 A1 | 12/2013 | Nagai et al. | |
| 2014/0082721 A1 | 3/2014 | Hershman et al. | |
| 2014/0115401 A1* | 4/2014 | Ito | G06F 11/1641 714/37 |
| 2014/0143883 A1 | 5/2014 | Shen-Orr et al. | |
| 2014/0281564 A1 | 9/2014 | Nagai et al. | |
| 2015/0074406 A1 | 3/2015 | Nagai et al. | |
| 2015/0089223 A1 | 3/2015 | Tasher et al. | |
| 2015/0089234 A1* | 3/2015 | Kaluzhny | G06F 21/85 713/176 |
| 2015/0103598 A1 | 4/2015 | Tasher et al. | |
| 2015/0212957 A1* | 7/2015 | Yuan | B41J 2/17546 710/3 |
| 2015/0213872 A1* | 7/2015 | Mazumder | G11C 11/408 365/218 |
| 2015/0287477 A1 | 10/2015 | Tasher et al. | |

FOREIGN PATENT DOCUMENTS

| | | |
|---|---|---|
| EP | 2566096 A2 | 3/2013 |
| WO | 2013035006 A1 | 3/2013 |

OTHER PUBLICATIONS

TCG PC Specific Implementation Specification, Version 1.1, 72 pages, Aug. 18, 2003.

TCG PC Client Specific Implementation Specification For Conventional BIOS, Version 1.20 FINAL Revision 1.00, 1.2; Level 2, 119 pages, Jul. 13, 2005.

TCG PC Client Specific TPM Interface Specification (TIS), Specification Version 1.21 Revision 1.00, 103 pages, Apr. 28, 2011.

TPM Main Part 1 Design Principles, Specification Version 1.2, Revision 62, 150 pages, Oct. 2, 2003.

Java Security Architecture, 62 pages, Dec. 6, 1998.

U.S. Appl. No. 14/467,077 Office Action dated Sep. 30, 2015.

KR Application # 10-2014-0125216 Office Action dated Feb. 16, 2016.

U.S. Appl. No. 14/301,456 Office Action dated Dec. 22, 2015.

U.S. Appl. No. 15/004,957 Office Action dated Feb. 24, 2016.

Turley, J., "New MIPS CPUs are Virtually Better: M5100 and M5150 Add Tasty Virtualization to the MIPS Recipe", Electronic Engineering Journal, 2 pages, Apr. 30, 2014.

Lin et al., "Enhance hardware security using FIFO in pipelines", 7th International Conference on Information Assurance and Security, Melacca, Malaysia, pp. 344-349, Dec. 5-8, 2011 (abstract).

(56) References Cited

OTHER PUBLICATIONS

U.S. Appl. No. 13/965,256 Office Action dated Jun. 27, 2016.
U.S. Appl. No. 15/068,587 Office Action dated Oct. 19, 2017.
U.S. Appl. No. 15/181,427 Office Action dated Jun. 21, 2017.

* cited by examiner

BUS PROTECTION WITH IMPROVED KEY ENTROPY

FIELD OF THE INVENTION

The present invention relates generally to data security, and particularly to methods and systems for protecting information delivered over a bus.

BACKGROUND OF THE INVENTION

In various computing systems a processor communicates with one or more peripheral modules over a bus. Methods for secure communication of information over a system bus are known in the art. For example, U.S. Patent Application Publication 2008/0155273, whose disclosure is incorporated herein by reference, describes a system, method, and logic for automatic hardware bus encryption/decryption. The logic receives a memory access request comprising a physical address of a memory location from a processor. The logic translates the physical address, and uses the translated physical address and a seed value in a pseudo random number generator to produce an output value. The logic then uses the output value to non-deterministically select an encryption key from a plurality of encryption keys.

U.S. Pat. No. 7,248,696, whose disclosure is incorporated herein by reference, describes data encryption for a differential bus employing transitional coding. The present invention maps, encodes and encrypts input data as a logic status for a given bus transfer cycle. The mapping, encoding and encrypting of the input data changes from bus transfer cycle to bus transfer cycle. The mapping, encoding and encrypting is a function of a pseudo-random number. A logic status is differentially transmitted from a bus transmitter to a bus receiver, to be mapped, decrypted and decoded as the corresponding output data.

U.S. Pat. No. 8,781,111, whose disclosure is incorporated herein by reference, describes software and hardware-based systems and methods for preventing side channel attacks. A side channel attack utilizes information gained from the physical implementation of a cryptosystem. Cryptographic hardware may introduce dummy operations to compensate for conditional math operations in certain functions such as modular exponentiation. Cryptographic hardware may also introduce random stalls of the data path to introduce alterations in the power profile for the operation. These alterations are designed to randomly change the timing and power profile of the requested function.

SUMMARY OF THE INVENTION

An embodiment of the present invention provides an apparatus, including a processor and a bus encryption unit. The processor is configured to communicate information over a secured data bus, and to communicate respective addresses over an address bus. The bus encryption unit is configured to generate an encryption key based on multiple addresses that appeared on the address bus, and to encrypt the information communicated between the processor and the secured data bus with the encryption key.

In some embodiments, the processor is configured to randomly halt execution of instructions therein so as to introduce randomness in the addresses appearing on the address bus. In other embodiments, the apparatus includes a Random Number Generator (RNG), which is configured to generate random numbers, and the processor is configured to randomly halt the execution based on the random numbers generated by the RNG.

In an embodiment, the bus encryption unit includes a Linear Feedback Shift Register (LFSR) that is configured to process the multiple addresses so as to generate the encryption key. In another embodiment, the bus encryption unit is configured to initialize the LFSR with a random value. In yet another embodiment, the bus encryption unit is configured to initialize the LFSR with a predefined initial value, and to start encrypting the information using the encryption key only after shifting the shift register a predefined number of positions.

In some embodiments, the apparatus includes a peripheral module that connects to the secured data bus using another bus encryption unit, which is configured to generate, based on the multiple addresses, a decryption key that matches the encryption key, to decrypt the encrypted information using the decryption key, and to deliver the decrypted communicated information to the peripheral module. In other embodiments, the bus encryption unit and the other bus encryption unit are configured to generate the encryption and decryption keys in synchronization with one another. In yet other embodiments, the bus encryption unit is configured to update the encryption key so that the information communicated before and after updating is encrypted using respective different encryption keys.

There is additionally provided, in accordance with an embodiment of the present invention, a method including communicating information by a processor over a secured data bus, and communicating respective addresses over an address bus. An encryption key is generated based on multiple addresses that appeared on the address bus, and the information communicated between the processor and the secured data bus is encrypted with the encryption key.

The present invention will be more fully understood from the following detailed description of the embodiments thereof, taken together with the drawings in which:

DETAILED DESCRIPTION OF EMBODIMENTS

Overview

Figure 1:
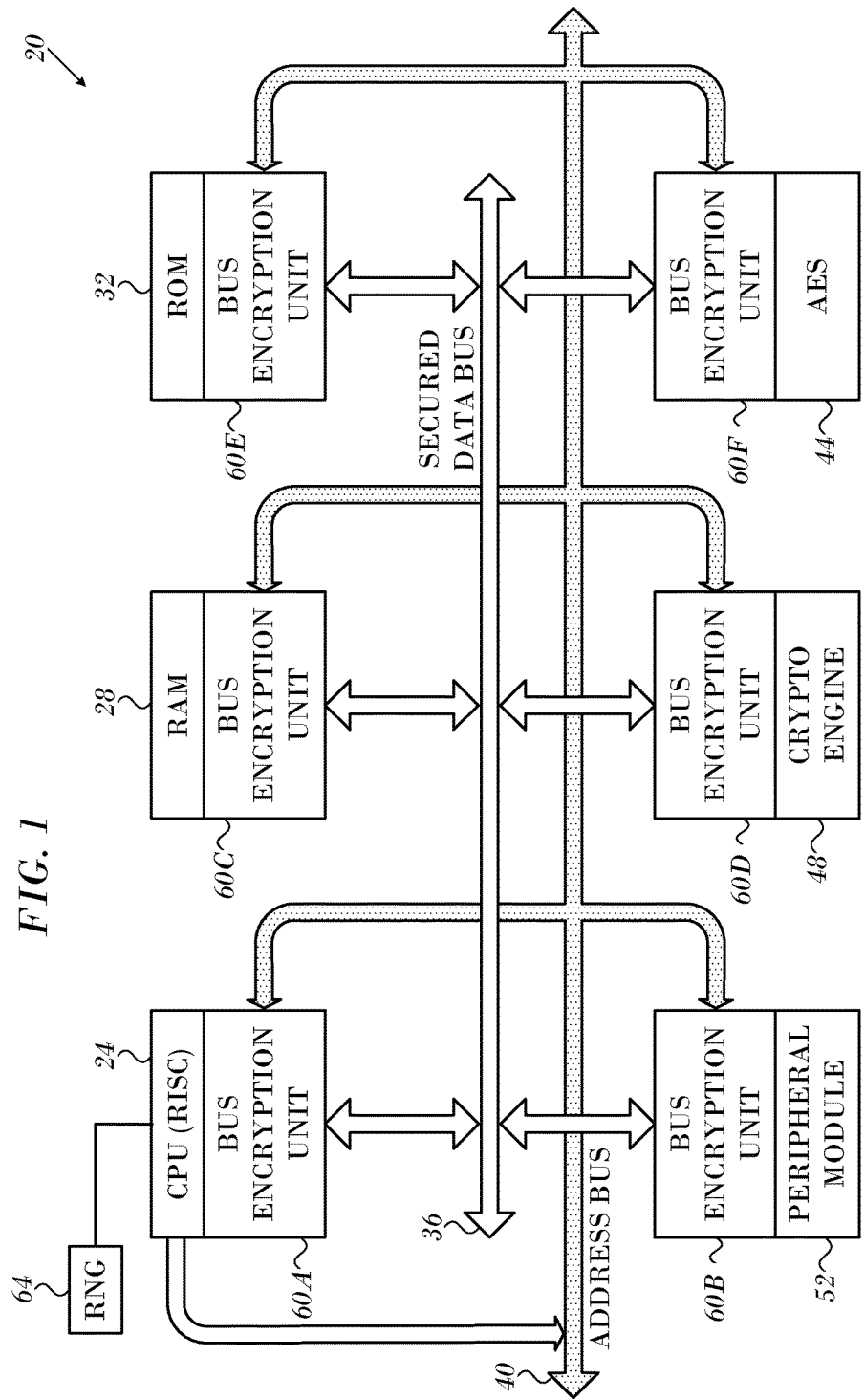
FIG. 1 is a block diagram that schematically illustrates a computing system, in accordance with an embodiment of the present invention.

In various secure computing systems, modules connect to a common bus that is physically unprotected. The modules connecting to the bus may comprise, for example, processors, memories and other peripheral modules of various types. Embodiments of the present invention that are described herein provide improved methods and systems for securing the communication among modules connecting to a bus. In some embodiments, the modules communicate with one another securely by encrypting the information delivered over the bus. Such techniques are also referred to as "bus encryption." Bus encryption may be used, for example, in System-on-Chip (SoC) devices or smartcards comprising a secure crypto-processor.

In the disclosed techniques, the modules communicate over a data bus and a corresponding address bus. Keys that encrypt information delivered over the data bus are derived locally at the different modules from multiple addresses that appear on the address bus. In some embodiments, improved key entropy is achieved mainly from three sources of randomness: 1) using multiple addresses (e.g., as opposed to a single address) to derive the key, 2) introducing randomness to the address sequence by randomly stalling the processor, and 3) initializing a true random value to a shift register that accumulates the address information. Embodiments that generate keys for bus encryption with improved entropy using at least the above mentioned sources of randomness are described in detail below.

In some embodiments, each module connects to the secured data bus via a bus encryption unit. The bus encryption unit comprises a cipher that encrypts data (plaintext), which the module sends to the data bus, and a de-cipher that decrypts encrypted data (cipher text), which the module receives from the data bus.

The disclosed techniques refer mainly to symmetric encryption, in which the cipher at the sending end and the respective de-cipher at the receiving end use identical keys. In the description that follows, the terms "encryption key," "secret key" or simply "key" for brevity, refer to both ciphering and de-ciphering keys, and are used interchangeably. The encryption key and respective decryption key are also referred to herein as matching keys.

Secret keys should be generated with sufficient randomness so that an attacker who has access to the data and/or address buses is unable to predict or guess the keys. One way to measure the randomness or predictability of a key is to measure the entropy of the key, e.g., in units of bits. For example, the entropy of a random 128-bit key is 128 bits, and it takes $2^{128-1}$ guesses (on average) to predict the value of the key by brute force. Note that the entropy of an N-bit key, which is generated by a process that is not truly random (e.g., by a pseudorandom process), may be significantly less than N bits.

In some embodiments, multiple bus encryption units share a common encryption key (or a common pair of matching keys), wherein each bus encryption unit generates a local instance of the common encryption key. In an embodiment, the bus encryption units update the encryption key frequently so that the time duration in which the key is valid is insufficient for guessing the key, even when an attacker attempts to guess the key using the strongest currently available computing means. Bus encryption units that share a common key should update their local instances of the key simultaneously.

In some embodiments, a Random Number Generator (RNG) generates true (or close to true) random number sequences from which encryption keys are derived. The RNG typically measures some physical phenomenon that is expected to be random such as atmospheric noise, thermal noise, and other external electromagnetic and quantum phenomena.

When first activated (e.g., at reset), the randomness of the RNG sequence is typically low, and may be insufficient for cryptographic uses. Typically, the entropy of the physical phenomenon that the RNG measures increases over time, and therefore the randomness of generated number sequence increases accordingly. Additionally, a sufficiently long interval is typically needed to collect sufficient entropy out of the RNG. In some embodiments, the output of the RNG is used for updating the secret keys (e.g., indirectly, as will be described below) and therefore the entropy of the updated keys is improved relative to the keys derived at reset.

One possible way to coordinate secret keys among the various modules is to distribute the output of the RNG among the bus encryption units that share a common secret key. Such implementation, however, is vulnerable to an attack in which cutting the physical connection, e.g., at the RNG output, stops the key update in the bus encryption units. In an embodiment, instead of distributing the RNG output, the bus encryption units derive the keys from address information that appears on the lines of the address bus. Thus, the system utilizes the address bus lines, which are inherently distributed among the CPU and peripheral modules, for the purpose of key generation.

The bus encryption units derive the encryption keys based on multiple addresses that appeared on the address bus (as opposed to deriving the keys directly from the RNG output). Using the address lines instead of distributing the output of a RNG for generating the keys saves unnecessary wiring and interfacing logic, and provides synchronous key updating among the bus encryption units. In an embodiment, the bus encryption units update the key at any suitable (average) rate, such as, for example, once per a few clock cycles or even every clock cycle.

In an embodiment, the bus encryption unit generates the encryption key using a Linear Feedback Shift Register (LFSR), wherein the key value is derived from the content of the shift register. In this embodiment, the address bus is input to the feedback logic of the LFSR in addition to the content of the shift register. As a result, addresses that appear on the address bus as the LFSR is being shifted are incorporated into the shift register, i.e., into the generated key. By including the address bus lines in the LFSR feedback logic, historical information of the addresses is accumulated and used to derive the encryption key.

In some embodiments, the processor comprises a pipeline that handles the order of instructions execution by the processor, and the output of the RNG is used to insert random stalls (delays) in the pipeline. Typically, the sequence of addresses (or parts thereof) that appear on the address bus during normal CPU execution has very low or zero entropy, and stalling the pipeline randomly introduces randomness to the addresses, and therefore also increases the entropy of the encryption keys, which are derived from these addresses.

System Description

FIG. 1 is a block diagram that schematically illustrates a computing system 20, in accordance with an embodiment of the present invention. System 20 can be used, for example, in System On Chip (SoC) or System In Package (SiP) devices, smartcards, and the like. System 20 may also be used in various host systems and devices, such as in various computing devices.

System 20 comprises a Central Processing Unit (CPU) 24, which accesses data stored in a Random-Access Memory (RAM) 28 and in a Read Only Memory (ROM) 32. CPU 24 may comprise, for example, a Reduced Instruction Set Computing (RISC) processor, a processor that is based on ARM architecture or any other suitable processor. CPU 24 is also referred to herein as a processor. RAM 28 may comprise, for example, a Dynamic RAM (DRAM) or other types of volatile memories. ROM 32 may comprise, for example, an Erasable Programmable ROM (EPROM).

Alternatively, RAM 28 and ROM 32 can be implemented using any suitable storage technology.

CPU 24 communicates with RAM 28 and ROM 32 over a secured data bus 36 and an address bus 40. In the present example, other peripheral modules with which CPU 24 communicates over buses 36 and 40 include a module supporting the Advanced Encryption Standard (AES) 44, a cryptographic engine 48, and a peripheral module 52, which can implement any other suitable function. Buses 36 and 40 may be proprietary or standardized, such as, for example, the Advanced Microcontroller Bus Architecture (AMBA), the Advanced High-performance Bus (AHB), the Advanced Peripheral Bus (APB), or any other suitable bus type.

CPU 24 and the various peripheral modules connect to secured data bus 36 via respective bus encryption units 60 (marked 60A . . . 60F in the figure), which are each configured to encrypt data to be sent over bus 36, and to decrypt encrypted data received from data bus 36.

In one embodiment, each of CPU 24 and the various peripheral modules comprises a separate semiconductor die, and the different dies reside on a common package or on separate packages. Alternatively, the CPU and/or one or more peripherals can reside on a single die. Bus encryption units 60 can reside on separate dies or included within the dies of the CPU and peripheral modules. We further assume that even if an unauthorized attacker has access to data bus 36, the attacker still has no direct access to secret information within each die (or to information exchanged between a module and its bus encryption unit), but can open the package or otherwise gain access to buses 36 and 40 signals in attempt to break the system security.

Each bus encryption unit 60 generates secret keys locally, and uses these keys for encryption and decryption. Bus encryption unit 60 updates it local encryption key in synchronization with other bus encryption units that share the same key. As will be explained in detail with reference to FIG. 2 below, each bus encryption unit 60 updates the keys based on multiple addresses that appear on address bus 40.

System 20 further comprises a Random Number Generator (RNG) 64, which generates true (or close to true) random number sequences. In some embodiments, RNG 64 measures some random physical phenomenon and generates the random sequences based on the physical phenomenon. As described above, the entropy at the RNG output is relatively modest on reset and typically improves over time.

In some embodiments, the output of RNG 64 is used to randomize the sequence of addresses that appear on bus 40 (and from which the encryption keys are derived). In some embodiments, the output of RNG 64 is additionally used for initializing the local keys within bus encryption units 60.

Computing system 20 may be implemented in hardware, e.g., using one or more Application-Specific Integrated Circuits (ASICs) or Field-Programmable Gate Arrays (FPGAs). Alternatively, the system may comprise a microprocessor that runs suitable software, or a combination of hardware and software elements.

The configuration of FIG. 1 is an example system configuration, which is shown purely for the sake of conceptual clarity. Alternatively, any other suitable computing system configuration can also be used. Elements that are not necessary for understanding the principles of the present disclosure, such as various interfaces, addressing circuits, timing and sequencing circuits and debugging circuits, have been omitted from the figure for clarity.

In the example system configuration shown in FIG. 1, CPU 24 and the various peripheral modules connecting to internal secured data bus 36 are integrated on separate semiconductor dies in a single Multi-Chip Package (MCP) or System on Chip (SoC). In alternative embodiments, however, the CPU and the peripheral modules may be implemented as separate Integrated Circuits (ICs). Further alternatively, some or all of the peripheral modules may reside on the same die on which the CPU is disposed. In some embodiments, CPU 24 and the peripheral modules may be fabricated on the same die, or on separate dies in the same device package. Bus encryption units 60 can be implemented on separate dies or on the same die of the CPU and peripheral modules.

In some embodiments, CPU 24 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although in FIG. 1 system 20 the CPU and various peripheral modules connect to internal system data bus 36 (e.g., as in SoC), in alternative embodiments, one or more of the peripheral modules may reside externally to the SoC. For example, in system 20 RAM 28 and/or ROM 32 can be implemented as external memories.

In the example of FIG. 1, CPU 24 controls the address bus from which the bus encryption units derive the encryption keys. In alternative embodiments, two or more peripheral modules (i.e., not including the CPU) may communicate with one another over the secured data bus by taking over the data and address buses. In such embodiments, the respective bus encryption units of the peripheral modules may share encryption keys that are different from the keys shared with the bus encryption unit of the CPU.

Entropy-Accumulating Generation of Secret Keys

Figure 2:
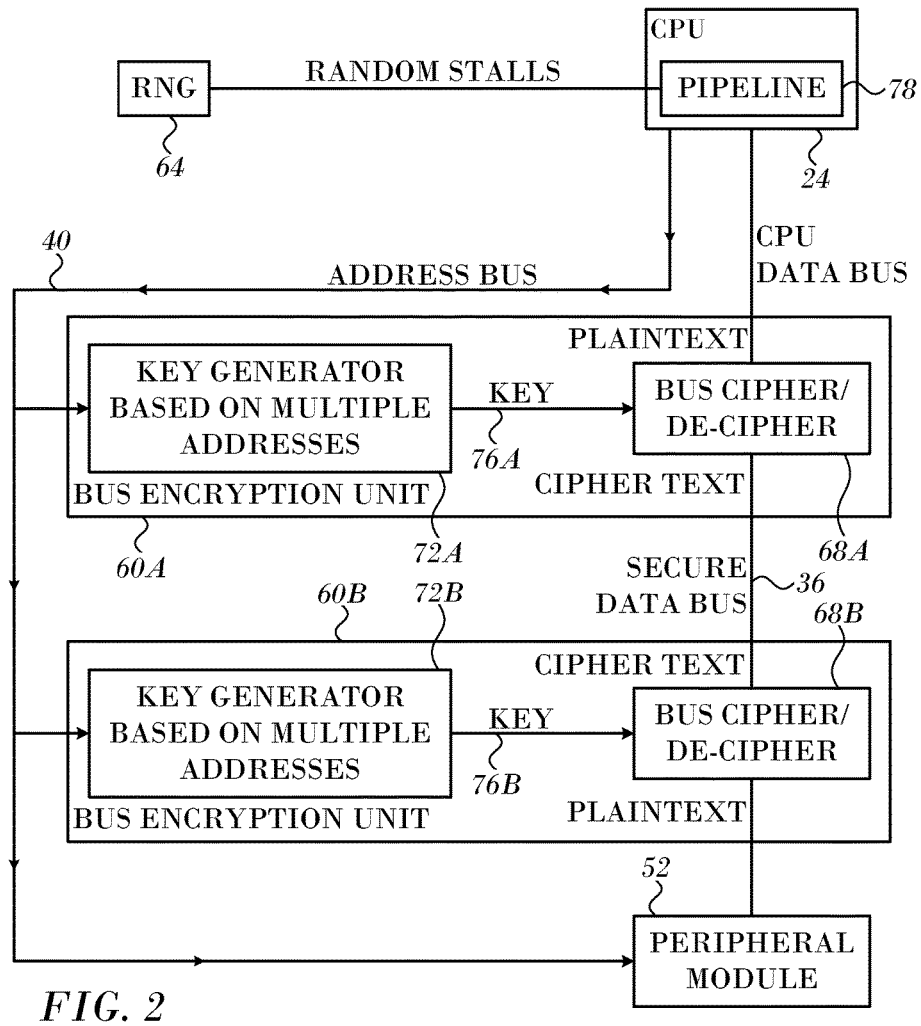
FIG. 2 is diagram that schematically illustrates secured communication using bus encryption units, in accordance with an embodiment of the present invention.

FIG. 2 is diagram that schematically illustrates secured communication using bus encryption units 60, in accordance with an embodiment of the present invention. In the example of FIG. 2, CPU 24 communicates information with peripheral module 52 over secured data bus 36. CPU and peripheral module 52 interface bus 36 via respective bus encryption units 60A and 60B, each comprising a cipher/de-cipher 68 and a key generator 72.

Cipher/de-cipher 68 may perform encryption and decryption using any suitable method. In some embodiments, e.g., when latency is critical, cipher/de-cipher 68 performs encryption/decryption by applying bitwise XOR between the plaintext or cipher text data and key 76.

When CPU 24 sends data to peripheral module 52, bus encryption unit 60A configures cipher/de-cipher 68A to encrypt the CPU data and to deliver the encrypted data to secured data bus 36. Similarly, bus encryption unit 60B configures cipher/de-cipher 68B to decrypt the encrypted data received from bus 36 and delivers the decrypted data to peripheral module 52. When peripheral module 52 sends data to CPU 24, bus encryption unit 60B configures cipher/decipher 68B to perform encryption, and bus encryption unit 60A configures cipher/decipher 68A to perform decryption.

Key generator 72 connects to address bus 40 and generates encryption key 76 based on multiple addresses that appear on bus 40. An example implementation of key generator 72 is described with reference to FIG. 3 below. Key generators 72A and 72B receive the same address information and update respective keys 76A and 76B simultaneously. In an embodiment, key generators 72A and 72B output respective updated keys 76A and 76B during the same clock cycle. Keys 76A and 76B are matching keys, which are used in encrypting/decrypting a secured data flow between CPU 24 and peripheral module 52.

CPU 24 further comprises a pipeline 78, which schedules the execution of instructions by CPU 24. During a pipeline stall, CPU 24 typically halts execution. The output of RNG 64 serves for stalling the pipeline randomly. In some embodiments, the RNG stalls the pipeline at random instances for a single or a predefined number of clock periods or CPU instructions. Alternatively or additionally, the RNG determines random stalling periods, e.g., in units of clock cycles or CPU instructions. During a stall period CPU 24 retains the address that appeared on address bus 40 prior to stalling, or alternatively puts some random address on address bus 40.

For example, stalling the address sequence A1, A2, A3, A4 at the time of address A2 results in a stalled sequence A1, A2, A2, A3, A4, in which the address denoted A2 appears on the address bus over two consecutive clock cycles. Alternatively, CPU 24 puts a random address AR during the stall period, resulting in the address sequence A1, AR, A2, A3, A4. By stalling pipeline 78 randomly, the sequence of addresses that appear on bus 40 becomes random, which makes the address sequence very hard or impossible to predict (e.g., by unauthorized attacker). Since key generation within key generator 72 is based, at least in part, on address information, the randomness that the key generator extracts from the address sequence increases the entropy of key 76.

The configuration of FIG. 2 is given by way of example, and other suitable configurations can also be used. For example, FIG. 2 mainly refers to symmetric encryption techniques, for which matching keys 76A and 76B are identical.

Figure 3:
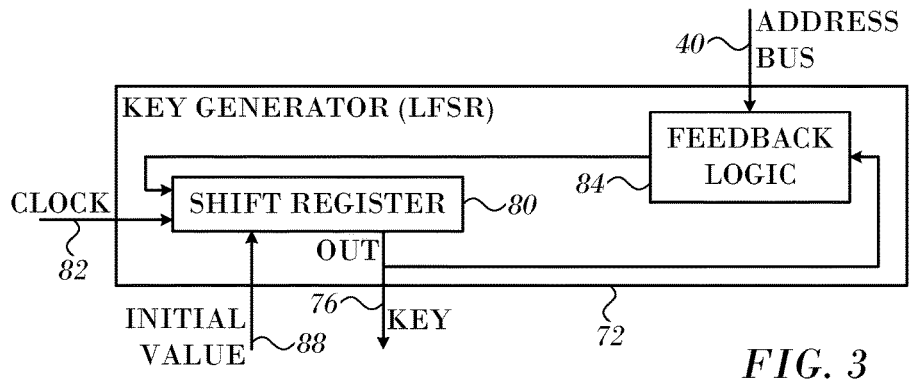
FIG. 3 is a block diagram that schematically illustrates a key generator unit, in accordance with an embodiment of the present invention.

FIG. 3 is a block diagram that schematically illustrates key generator unit 72, in accordance with an embodiment of the present invention. Key generator 72 in FIG. 3 can be used, for example in implementing bus encryption units 60 that were described in FIGS. 1 and 2 above.

Key generator 72 comprises a shift register 80, which is shifted by applying clock pulses 82. Feedback logic 84 receives as inputs (at least part of) the output of shift register 80, and address bus 40, and applies to the respective inputs a suitable logic operation. The output of feedback logic 84 is shifted into shift register 80 via its serial input. In an embodiment, feedback logic 84 applies to its inputs a XOR operation. Alternatively, feedback logic 84 can apply any other suitable logic operation.

When starting key generation (e.g., on reset), key generator 72 initializes shift register 80 with an initial value 88. In one embodiment, initial value 88 originates from RNG 64 (or from some other source of random information in the system.) In another embodiment, key generator 72 initializes shift register 80 to the same (e.g., predefined) initial value 88 on every reset event. In this embodiment, the randomness of key 76 is based mainly on the randomness that RNG 64 induces (via randomly stalling pipeline 78) on the address sequence that appears on address bus 40.

In some embodiments, when initializing shift register 80 to a fixed initial value, the system starts encrypting/decrypting using encryption keys 76 only after the keys accumulate sufficient entropy. For example, the system may use the encryption keys only after applying a predefined number of shift operations to the LFSR.

The configuration of FIG. 2 is given by way of example, and other suitable configurations can also be used. For example, in alternative embodiments, the key generation in key generators 72 is based on any suitable logic other than LFSR, which incorporates multiple addresses that appear on the address bus in generating keys 76.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
   a first processor, which is configured to communicate information over a secured data bus, and to communicate respective addresses having respective address values over an address bus; and
   logic circuitry, which is coupled to the secured data bus and to the address bus, and which is configured to:
   calculate an encryption key whose entropy stems from an amount of randomness conveyed by a sequence of multiple address values that appeared on bus lines of the address bus, by applying a logic operation to the multiple address values in the sequence;
   encrypt, using the encryption key, information originating in the first processor and destined to a second processor that is coupled to the secured data bus; and
   send the encrypted information to the second processor over the secured data bus.

2. The apparatus according to claim 1, wherein the first processor is configured to randomly halt execution of instructions therein so as to introduce randomness in the address values appearing on the bus lines of the address bus.

3. The apparatus according to claim 2, and comprising a Random Number Generator (RNG), which is configured to generate random numbers, wherein the first processor is configured to randomly halt the execution based on the random numbers generated by the RNG.

4. The apparatus according to claim 1, wherein the logic circuitry comprises a Linear Feedback Shift Register (LFSR) that is configured to apply the logic operation to the multiple address values in the sequence so as to generate the encryption key.

5. The apparatus according to claim 4, wherein the logic circuitry is configured to initialize the LFSR with a random value.

6. The apparatus according to claim 4, wherein the logic circuitry is configured to initialize the LFSR with a predefined initial value, and to start encrypting the information using the encryption key only after shifting the shift register a predefined number of positions.

7. The apparatus according to claim 1, wherein the second processor is coupled to the secured data bus using another logic circuitry, which is configured to calculate a decryption key that matches the encryption key by applying the logic operation to the multiple address values in the sequence, to decrypt the encrypted information using the decryption key, and to deliver the decrypted information to the second processor.

8. The apparatus according to claim 7, wherein the logic circuitry and the other logic circuitry are configured to generate the encryption and decryption keys in synchronization with one another.

9. The apparatus according to claim 1, wherein the logic circuitry is configured to update the encryption key so that the information communicated before and after updating is encrypted using respective different encryption keys.

10. A method, comprising:
communicating information by a first hardware processor over a secured data bus, and communicating respective addresses having respective address values over an address bus;
calculating an encryption key whose entropy stems from an amount of randomness conveyed by a sequence of multiple address values that appeared on bus lines of the address bus, by applying a logic operation to the multiple address values in the sequence;
encrypting, using the encryption key, information originating in the first processor and destined to a second processor that is coupled to the secured data bus; and
sending the encrypted information to the second processor over the secured data bus.

11. The method according to claim 10, wherein calculating the encryption key comprises randomly halting execution of instructions by the first hardware processor so as to introduce randomness in the address values appearing on the bus lines of the address bus.

12. The method according to claim 11, wherein randomly halting the execution comprises halting the execution based on random numbers generated by a Random Number Generator (RNG).

13. The method according to claim 10, wherein calculating the encryption key comprises applying the logic operation to the multiple address values in the sequence using a Linear Feedback Shift Register (LFSR).

14. The method according to claim 13, wherein calculating the encryption key comprises initializing the LFSR with a random value.

15. The method according to claim 13, wherein calculating the encryption key comprises initializing the LFSR with a predefined initial value, and starting encrypting the information using the encryption key only after shifting the LFSR a predefined number of positions.

16. The method according to claim 10, wherein the second processor is coupled to the secured data bus using logic circuitry, and comprising calculating, using the logic circuitry, a decryption key that matches the encryption key by applying the logic operation to the multiple address values in the sequence, decrypting the encrypted information using the decryption key, and delivering the decrypted information to the second processor.

17. The method according to claim 16, wherein calculating the encryption and decryption keys comprises calculating the encryption and decryption keys synchronously.

18. The method according to claim 10, wherein calculating the encryption key comprises updating the encryption key so that the information communicated before and after updating is encrypted using respective different encryption keys.

* * * * *